United States Patent [19]
Pfister, III et al.

[11] 3,882,097
[45] May 6, 1975

[54] α-METHYL GLUTATHIONE, ANALOGS THEREOF, INTERMEDIATES THEREFORE AND PROCESSES FOR THEIR PREPARATION

[75] Inventors: Karl Pfister, III, Westfield, N.J.; Daniel F. Veber, Ambler; Ralph F. Hirschmann, Blue Bell, both of Pa.

[73] Assignee: Merck & Co., Inc., Rahway, N.J.

[22] Filed: May 10, 1972

[21] Appl. No.: 252,139

Related U.S. Application Data

[63] Continuation of Ser. No. 856,878, Aug. 13, 1969, abandoned, which is a continuation of Ser. No. 605,958, Dec. 30, 1966, abandoned.

[52] U.S. Cl.............................. 260/112.5; 424/177
[51] Int. Cl.. C07c 103/52; A61k 17/02; C07a 7/00
[58] Field of Search................................. 260/112.5

[56]   References Cited
   UNITED STATES PATENTS
2,900,375   8/1959   Amiard et al................... 260/112.5

OTHER PUBLICATIONS

Hayakawa et al.: Bull. Chem. Soc. Japan, 39, 391–395 (1966).
Miller et al., J. Biol. Chem., 140, 411–416 (1941).
King et al., J. Chem. Soc., 1957, 880–885.
Hegedus, Helv. Chim. Acta, 31, 737–748 (1948).
Kovacs et al., J. Am. Chem. Soc., 85, 1839–1844 (1963).
Gibian et al., Ann. Chem., 640, 145–156 (1961).
Schröder et al., Ann. Chem., 673, 208–220 (1964).

*Primary Examiner*—Lewis Gotts
*Assistant Examiner*—Reginald J. Suyat
*Attorney, Agent, or Firm*—J. Jerome Behan; Henry H. Bassford, Jr.

[57]   ABSTRACT

This disclosure describes the preparation of α-methyl glutathione and its aspartyl analog by the reaction of N-carbobenzoxy-α-methyl glutamic or aspartic acid anhydrides with S-benzyl-cysteinyl glycine at a temperature of about 0°C. and a pH of about 11. The protecting groups are subsequently removed by reduction with sodium in liquid ammonia. The preparation of N-carbobenzoxy-α-methyl glutamic and aspartic acid anhydrides by dehydration of the substituted acids with acetic anhydride or dicyclohexylcarbodiimide is also described.

1 Claim, No Drawings

α-METHYL GLUTATHIONE, ANALOGS THEREOF, INTERMEDIATES THEREFORE AND PROCESSES FOR THEIR PREPARATION

This application is a continuation of Ser. No. 856,878, filed Aug. 13, 1969, now abandoned, which, in turn, is a continuation of Ser. No. 605,958, filed Dec. 30, 1966, now abandoned.

This invention is concerned with α-lower alkyl glutamic acid anhydrides and α-lower alkyl aspartic acid anhydrides in which the amino group is protected with a readily removable substituent such as the carbobenzoxy group. It is concerned also with valuable new compounds which may be prepared utilizing these anhydrides.

The novel anhydrides with which this invention is concerned are especially useful for the preparation of novel γ-(α-lower alkyl-glutamyl and aspartyl peptides such as α-methyl glutathione, i.e., γ-(α-methyl-glutamyl)-cysteinyl-glycine and the aspartyl analogs of this compound. Glutathione is a known, naturally occurring product which is widely distributed in nature. It may be isolated from a variety of natural sources including yeast, liver and muscle tissue. It is known to participate in numerous enzymatically controlled redox reactions involved in the metabolic cycles of plants; animals, including humans; microorganisms, including bacteria and viruses; and insects. In these cycles it is interconverted between its oxidized form, γ-(α-glutamyl)-cysteinyl-glycine and its reduced form, γ-(α-glutamyl)-cystinyl-glycine. The ease with which the interconversion takes place accounts for the importance of this compound in metabolic cycles involving redox reactions.

One of the more challenging problems in modern physiological chemistry is the preparation of homologs and analogs of known physiologically active substances. The preparation of such compounds and the replacement of the known physiologically active compounds with them in the same environment often leads to useful information as to the mode of action of the known active compounds. Very often it provides information which allows the synthetic preparation of therapeutically active compounds which can be employed in place of the natural compound which in many instances are extremely difficult to isolate in pure, active form from natural sources. Occasionally, the synthetic compounds are more active than the natural compounds. The high activity of the synthetic compound, prednisolone compared to the natural product, hydrocortisone is a case in point.

Another important result which can be achieved by preparation and study of homologs and analogs of known physiologically active compounds is that such compounds may act as systemic poisons for pathogenic organisms, insect pests and undesirable plant life by interfering with essential metabolic cycles. Usually such compounds function by entering one step of the metabolic pathways of the organism, insect or plant to produce a compound which cannot be utilized in the next step of the pathway. The metabolic pathway thus comes to a halt. The interfering compound is called an antagonist. The compound α-methyl glutathione is a glutathione antagonist in some enzyme systems which utilize glutathione. The interference of carbon monoxide with the respiratory cycle by combining with hemoglobin is another well known instance of this type of poisoning. Such compounds are useful amongst other purposes as antibiotics, antidiabetics, anthelmintics, antiviral agents and herbicides.

The compounds α-methyl glutathione and its aspartyl analog γ-(α-methyl-aspartyl) cysteinyl-glycine which can be prepared in accordance with this invention are a homolog and an analog respectively of the natural compound, glutathione and accordingly useful as described above. The preparation of structural variants of glutathione is complicated by the fact that in glutathione the peptide linkage of the glutamic acid to the cysteine is through the γ-carboxyl group of the acid. Any procedure for the preparation of close structural variants of such components must substantially exclude the formation of a peptide bond involving the α-carbonyl group of the glutamic or aspartic acid.

Moreover the sulfhydryl group of the cysteine is especially reactive and must be protected to minimize undesirable side reactions occurring during peptide formation. The protecting group must be readily removable without adversely affecting other functional groups in the molecule. Ideally the sulfhydryl protecting group should be removable under the same conditions employed for the group which is used to protect the amino substituent on the glutamic or aspartic acid moiety.

This invention provides processes by which structural modifications of glutathione in which a hydrogen atom of the α-carbon atom of the dicarboxylic acid segment of the molecule is replaced with a lower alkyl group, for example one containing from one to six or more carbon atoms in a branched or unbranched radical. The products prepared by these processes are substantially free of the α-isomer. In the presently preferred process of the invention, the protecting groups for the sulfhydryl and amino functions are especially selected so that they can be removed simultaneously.

In accordance with this invention, cysteinyl-glycine in which the sulfhydryl group is protected, for example with a benzyl group, is reacted with an α-lower alkyl glutamic or aspartic anhydride, for example N-carbobenzoxy-α-methyl glutamic acid anhydride to produce γ-(N-carbobenzoxy-α-lower alkyl glutamyl)-s-benzyl-cysteinyl-glycine or its α-lower alkyl aspartyl analog. Treatment of the novel intermediates with sodium in liquid ammonia may be employed to remove both protecting groups simultaneously.

For convenience the invention will now be described in detail as applied to the α-methyl glutamic acid homolog of glutathione. The description is equally applicable to the preparation of other α-lower alkyl glutamic acid derivatives and to α-lower alkyl aspartic acid derivatives.

The compound γ-(N-carbobenzoxy-α-methyl glutamyl)-S-benzyl-cysteinyl glycine may be prepared by reacting the N-carbobenzoxy-α-methyl-glutamic acid anhydride with S-benzyl-cysteinyl glycine under alkaline conditions in an aqueous solvent. Reaction is preferably effected at room temperature, i.e. 20° to 30°C, although temperatures somewhat above or below this range may be employed without adversely affecting the reaction. The reaction period may vary from about 10 minutes to about 2 hours, depending principally on the selected reaction temperature. Good yields are obtained using equimolar quantities of reactants, although up to about a 25 percent molar excess of either reactant may be employed to good effect. The reaction is carried out in an alkaline medium, preferably from about 7.5 to about 9.5. Various buffers may be used to maintain the pH within the desired range. These may include for example borate, phosphate and carbonate buffers. Additional base, for example, an alkali metal hydroxide may be added during the reaction to prevent large fluctuations in hydrogen ion concentration. The solubility of the reactants may be enhanced by utilization of reaction inert water miscible solvents such as dioxane, tetrahydrofuran or acetone, and the like. At the end of the reaction period the pH of the solution is adjusted to the acid side, e.g., from about 1.5 to about 3.5 to convert the novel salt to the acid which may be isolated by any convenient procedure.

Equimolar quantities of reactants can be employed, although the utilization of a slight excess, say up to a 10 percent molar excess of either reactant will usually improve the yields.

The S-benzyl-cysteinyl-glycine used in the reaction described above may be prepared by any known method. In a preferred aspect of this invention it is prepared by reaction between N-carboxy-S-benzyl-cysteine anhydride and glycine and converted in situ to the desired final product by reaction with, for example, N-carbobenzoxy-α-methyl glutamic acid anhydride. In this aspect of the invention N-carboxy-S-benzyl-cysteine anhydride, prepared by phosgenation of S-benzyl cysteine is reacted with glycine in an alkaline medium at a pH of from about 8.5 to 10.5 and a temperature of from about 0° to about 10°C during a period of from about 30 seconds to about 2 minutes. Although equimolar quantities of reactants may be employed it is preferred to utilize a slight excess, say up to about a 10 percent molar excess of anhydride to insure as complete a reaction as possible.

The intermediate S-benzyl-cysteinyl-glycine carbamate which forms is decarboxylated by acidifying the mixture to from about 1.5 to about 4, conveniently by the addition of a mineral acid such as sulfuric or hydrochloric. The carbamate decomposes with the evolution of carbon dioxide. Complete removal of the carbon dioxide may be facilitated by bubbling nitrogen through the acidified reaction mixture.

After decarboxylation the pH of the reaction mixture which contains S-benzyl-cysteinyl-glycine is adjusted to the alkaline side of neutrality. The selected N-protected-α-methyl-glutamic or aspartic acid anhydride is then added and reaction is continued as described above.

As stated above, the preferred protecting group for the α-methyl glutamic, or aspartic acid moiety is the carbobenzoxy group since both this group and the benzyl group on the cysteine segment can be removed simultaneously by the use of an alkali metal, preferably sodium, in liquid ammonia. Reaction is conveniently effected by the addition of metallic sodium to a solution of the protected peptide in liquid ammonia. Sufficient sodium is added until the light blue color indicative of unreacted sodium persists for several minutes. The excess sodium is then decomposed and the ammonia evaporated off. Evaporation may be carried out under nitrogen to minimize side reactions, but this is not essential.

The desired product may be isolated from the residue remaining after removal of the ammonia by any convenient method. In one convenient method the residue is taken up in diluate mineral acid, extracted with a water immiscible organic solvent and the desired product precipitated from the aqueous layer as the copper salt. If sulfuric acid is used, the precipitate is dialyzed to remove the sulfuric acid associated with the precipitated copper salt. The salt is then treated with hydrogen sulfide in an aqueous medium to precipitate copper sulfide which is removed by filtration. The filtrate may be freeze dried to obtain the desired product.

N-carbobenzoxy-α-lower alkyl glutamic acid anhydrides and the corresponding aspartic acid anhydrides are prepared by dehydration of the N-substituted corresponding acids utilizing mild dehydrating agents such as acetic anhydride or dicyclohexylcarbodiimide. The N-substituted acids themselves are prepared by reaction of carbobenzoxy chloride with the α-lower alkyl acids which are prepared by known methods, for example α-methyl aspartic acid can be prepared by reaction of hydrogen cyanide with ethyl β-amino crotonate followed by acid hydrolysis of the ester.

The following non-limiting examples are given by way of illustration only.

EXAMPLE 1

N-Carbobenzoxy-α-Methyl-DL-Glutamic Acid Anhydride a. Acetic anhyride procedure

A total of 5 g. (0.17 mole) of N-carbobenzoxy-α-methyl-DL-glutamic acid is suspended in 20 ml. of acetic anhydride and stirred for about 5 hours at ambient temperature to produce a homogeneous solution. The acetic anhydride is removed at reduced pressure at 50°–60°C and the residual oil flushed several times with chloroform. The resulting oil is triturated with ether to give the desired product.

b. Dicyclohexylcarbodiimido procedure

A total of 8.31 (0.03 mole) of N-carbobenzoxy-α-methyl-DL-glutamic acid is dissolved in 250 ml. of dioxane, and 6.18 g. (0.03 mole) of dicyclohexylcarbodiimido is added with stirring. The solution is allowed to stand at ambient temperature for 18 hours. The dicyclohexyl urea which forms is removed by filtration and the precipitate washed to 20 ml. of dioxane. The washing liquid and the filtrate are combined and the desired product isolated by removal of the solvent at reduced pressure. The dioxane solution of the anhydride can be used directly without isolation of the product.

Procedures (a) and (b) are used to prepare the following compounds:

N-carbobenzoxy-α-methyl-DL-aspartyl anhydride
N-carbobenzoxy-α-ethyl-DL-glutamic acid anhydride
N-carbobenzoxy-α-ethyl-DL-aspartic acid anhydride
N-carbobenzoxy-α-isobutyl-DL-glutamic acid anhydride
N-carbobenzoxy-α-hexyl-DL-aspartic acid anhydride

EXAMPLE 2

γ-(N-Carbobenzoxy-α-Methyl Glutamyl)-S-Benzyl-L-Cysteinyl-Glycine a. S-benzyl-L-cysteinyl-glycine A total of 7.5 g. (0.1 mole) of glycine is dissolved in 1 liter of 1 molar potassium borate buffer at pH 11.0 and the solution cooled at 0°C. This solution is placed in a blender with 400 g. of ice, and 24.9 g. (0.105 mole) of N-carboxy-S-benzyl-L-cysteine anhydride is added with high speed stirring. Stirring is continued for 90 seconds and the mixture filtered. The pH of the filtrate is adjusted to 4.5 and it is again filtered. The solution of S-benzyl-L-cysteinyl-glycine can be used directly or the desired product can be isolated.

Isolation is effected on a 500 mil. carbon column which is washed with 3 liters of water to remove salts and residual glycine. The desired product is isolated from the column with 5 percent acetic acid in 50 percent aqueous acetone. The product is isolated from the eluate by evaporation of the solvent at reduced pressure.

b. γ-(N-carbobenzoxy-α-methyl glutamyl)-S-benzyl-L-cysteinyl-glycine

A total of 8.04 g. (0.03 mole) of the product prepared in (a) and 5.04 g. (0.06 mole) of sodium bicarbonate is dissolved in 500 ml. of water and the pH adjusted to 8.0 at 25°C. A solution of 0.03 mole of N-carbobenzoxy-α-methyl-DL-glutamic acid anhydride in 270 ml. of dioxane prepared as described in Example 1(b) is added over a period of 20 minutes and the pH held at 8.0 by the addition of sodium hydroxide solution. The reaction mixture is stirred an additional hour and the pH adjusted to 1.5 with sulfuric acid. A total of 500 ml. of water is added and the mixture extracted twice with 500 ml. portions of ethyl acetate. The ethyl acetate extracts are dried over sodium sulfate and the solvent removed at reduced pressure to yield the desired product.

The procedure is utilized to prepare the following compounds from the products prepared in Example 1:

γ-(N-carbobenzoxy-α-methyl-DL-aspartyl)-S-benzyl-L-cysteinyl-glycine
γ-(N-carbobenzoxy-α-ethyl-DL-glutamyl)-S-benzyl-L-cysteinyl-glycine
γ-(N-carbobenzoxy-α-ethyl-DL-aspartyl)-S-benzyl-L-cysteinyl-glycine
γ-(N-carbobenzoxy-α-isobutyl-DL-glutamyl)-S-benzyl-L-cysteinyl-glycine
γ-(N-carbobenzoxy-α-hexyl-DL-aspartyl)-S-benzyl-L-cysteinyl-glycine The same procedures are used to prepare D and L glutamyl and aspartyl isomers of the above compounds utilizing the optical isomers prepared in accordance with the procedure of Example 1

EXAMPLE 3

γ-(α-Methyl-DL-Glutamyl)-L-Cysteinyl-Glycine

A total of 4.0 g. (0.0073 mole) of the compound prepared in Example 2 is dissolved in 250 ml. of liquid ammonia. Metallic sodium is added until a light blue color persists for 5 minutes. The excess sodium is removed by the addition of ammonium chloride and the ammonia evaporated off under a stream of nitrogen. The residual solids are dissolved in 125 ml. of 0.5 N sulfuric acid and the solution extracted with ethyl acetate to remove dibenzyl. The desired product is precipitated as the copper salt by the addition of small portions of copper oxide until the reddish color holds. The copper salt is isolated by centrifugation and dialyzed to remove the equivalent of sulfuric acid associated with the copper salt. The copper is removed as the sulfide by bubbling hydrogen sulfide into the mixture. The precipitation is removed and the desired product is isolated by freeze drying the solution.

The following products are similarly prepared from the appropriate starting compounds prepared in accordance with the procedures of the previous examples.

γ-(α-methyl-DL-aspartyl)-L-cysteinyl-glycine
γ-(α-ethyl-DL-glutamyl)-L-cysteinyl-glycine
γ-(α-ethyl-DL-aspartyl)-L-cysteinyl-glycine
γ-(α-isobutyl-DL-glutamyl)-L-cysteinyl-glycine
γ-(α-hexyl-DL-aspartyl)-L-cysteinyl-glycine The same procedures are utilized to prepare D and L forms of those same glutamyl and aspartyl compounds from the corresponding products of the previous examples.

Van Slyke amino nitrogen analysis of these products analyzes for approximately two equivalents of nitrogen. This shows that the products are substantially free of α-isomers. It is well-known that γ-peptides give two equivalents of nitrogen in Van Slyke analyses and that α-peptides give one equivalent of nitrogen.

A typical example of the utility of compounds such as those prepared in accordance with the procedures of this invention is the growth inhibitory activity of α-methyl glutathione towards cell lines derived from neoplastic growth. In standard tests in which the cytotoxicity of the compound was tested against monolayers of normal cell cultures of mouse and chick embryo; rabbit and grivet kidney and human amnion grown in standard nutrient media, the toxicity titer was found to be greater than 100 γ/ml. The same compound when tested against monolayers of the cell lines identified by the designation Hela-1 and H-Ep-2Y-1, both derived from neoplastic growth, was found to have a toxicity titer of 31.25 γ/ml. and 125 γ/ml. When tested in cell suspension against the same cell lines the toxicity titer was only 0.1 γ/ml. and 0.8 γ/ml. respectively. The test methods are described in detail in Tamm and Names Virology; Vol. 4, No. 3, December, 1957, pages 483–498; Names and Hilleman, Proceedings of the Society For Experimental Biology and Medicine; Vol. 119, 1965, pages 515–520; and Rightsel et al., University of Michigan Medical Bulletin; Vol. XXIV, June 1958, pages 222–234.

What is claimed is:

1. A process for the preparation of γ-(α-methyl-glutamyl)-L-cysteinyl-glycine and the aspartyl analog thereof which comprises reacting under aqueous alkaline conditions, at a pH of about 7.5 to 9.5, at a temperature of about 20° to 30°C., and for a period of about 10 min. to about 2 hours, S-benzyl-L-cysteinyl-glycine with an N-carbobenzoxy-α-methyl glutamic acid anhydride or an aspartic acid anhydride analog thereof, the reactants being in the proportion of equimolar quantities of each up to about 25 percent molar excess of either reactant, adjusting the pH to about 1.5 to 3.5 thereby decarboxylating the resulting carbamate, and reacting the resulting γ-(N-carbobenzoxy-α-methyl-glutamyl)-S-benzyl-L-cysteinyl-glycine or aspartyl analog thereof with sodium in liquid ammonia thereby removing the S-benzyl and N-carbobenzoxy protecting groups.

* * * * *